US012040528B2

(12) United States Patent
Tamaru

(10) Patent No.: US 12,040,528 B2
(45) Date of Patent: Jul. 16, 2024

(54) DIRECTIONAL COUPLER

(71) Applicant: Murata Manufacturing Co., Ltd., Kyoto (JP)

(72) Inventor: Ikuo Tamaru, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 139 days.

(21) Appl. No.: 17/931,974

(22) Filed: Sep. 14, 2022

(65) Prior Publication Data

US 2023/0006328 A1 Jan. 5, 2023

Related U.S. Application Data

(63) Continuation of application No. PCT/JP2021/014683, filed on Apr. 6, 2021.

(30) Foreign Application Priority Data

May 9, 2020 (JP) ................................ 2020-082906

(51) Int. Cl.
*H01P 5/18* (2006.01)
*H01P 7/08* (2006.01)

(52) U.S. Cl.
CPC .............. *H01P 5/184* (2013.01); *H01P 7/082* (2013.01)

(58) Field of Classification Search
CPC .. H01P 1/18; H01P 1/184; H01P 1/187; H01P 5/12; H01P 5/16; H01P 5/18; H01P 5/184; H01P 7/08; H01P 7/082
See application file for complete search history.

(56) References Cited

U.S. PATENT DOCUMENTS

| | | | | |
|---|---|---|---|---|
| 9,077,061 | B2 * | 7/2015 | Tamaru | H01P 5/184 |
| 10,340,575 | B2 * | 7/2019 | Tanaka | H01P 5/184 |
| 2012/0161897 | A1 | 6/2012 | Tamaru et al. | |
| 2012/0319797 | A1 | 12/2012 | Tamaru | |
| 2016/0172737 | A1 | 6/2016 | Srirattana et al. | |
| 2017/0077967 | A1 | 3/2017 | Srirattana et al. | |
| 2017/0324392 | A1 | 11/2017 | Srirattana et al. | |

(Continued)

FOREIGN PATENT DOCUMENTS

| | | | |
|---|---|---|---|
| CN | 102484305 | A | 5/2012 |
| CN | 102832435 | A | 12/2012 |
| JP | H08-237012 | A | 9/1996 |

(Continued)

OTHER PUBLICATIONS

International Search Report for PCT/JP2021/014683 dated Jun. 22, 2021.

*Primary Examiner* — Long Nguyen
(74) *Attorney, Agent, or Firm* — Pearne & Gordon LLP

(57) ABSTRACT

To provide a directional coupler in which a coupling characteristic is made even flatter. There are included an input terminal, an output terminal, a coupling terminal, a termination terminal, ground terminals, a main line, a first sub line, and a second sub line. The main line is electromagnetically coupled to sub lines (first sub line, second sub line). A phase conversion unit (low pass filter) is connected between the first sub line and the second sub line. Between a point between the coupling terminal and the termination terminal, and the ground terminals, a resonant circuit is connected in which an inductor, a capacitor, and a resistor are connected in series.

13 Claims, 9 Drawing Sheets

(56) References Cited

U.S. PATENT DOCUMENTS

| | | | |
|---|---|---|---|
| 2018/0102582 | A1 | 4/2018 | Tanaka |

FOREIGN PATENT DOCUMENTS

| | | | |
|---|---|---|---|
| JP | H10-290108 | A | 10/1998 |
| JP | 2007-194870 | A | 8/2007 |
| JP | 2013-005076 | A | 1/2013 |
| JP | 2013-183351 | A | 9/2013 |
| JP | 2017-537555 | A | 12/2017 |
| WO | 2011/074370 | A1 | 6/2011 |
| WO | 2017/010238 | A1 | 1/2017 |

* cited by examiner

DIRECTIONAL COUPLER

CROSS REFERENCE TO RELATED APPLICATION

This is a continuation of International Application No. PCT/JP2021/014683 filed on Apr. 6, 2021 which claims priority from Japanese Patent Application No. 2020-082906 filed on May 9, 2020. The contents of these applications are incorporated herein by reference in their entireties.

BACKGROUND ART

Technical Field

The present disclosure relates to a directional coupler.

Patent Document 1 (Japanese Unexamined Patent Application Publication No. 8-237012) discloses a directional coupler. In the directional coupler, a main line is provided between an input terminal and an output terminal, a sub line is provided between a coupling terminal and a termination terminal, and the main line and the sub line are electromagnetically coupled to each other. In the directional coupler disclosed in Patent Document 1, when a signal is input to the input terminal, a coupling signal having a certain ratio of power to the power of the signal is output from the coupling terminal.

In the directional coupler disclosed in Patent Document 1, there is an issue of an increase in the degree of coupling between the main line and the sub line with increasing frequency of a signal input from the input terminal. In other words, in the directional coupler disclosed in Patent Document 1, an amplitude characteristic (coupling characteristic) of the coupling signal is not flat.

A directional coupler that mitigates this issue is disclosed in Patent Document 2 (Japanese Unexamined Patent Application Publication No. 2013-5076). In the directional coupler disclosed in Patent Document 2, a sub line is divided into a first sub line and a second sub line, and a low pass filter is connected, as a phase conversion unit, between the first sub line and the second sub line. In the directional coupler disclosed in Patent Document 2, the low pass filter is designed to cause a phase shift to be produced in a signal passing therethrough in such a manner that the absolute value of the phase shift monotonically increases within a range from 0 to 180 degrees inclusive as a frequency increases in a frequency band that is used.

Thus, in the directional coupler disclosed in Patent Document 2, a coupling characteristic is flat to some degree.

Patent Document 1: Japanese Unexamined Patent Application Publication No. 8-237012

Patent Document 2: Japanese Unexamined Patent Application Publication No. 2013-5076

BRIEF SUMMARY

In the directional coupler disclosed in Patent Document 2, the phase conversion unit (low pass filter) has a frequency characteristic, and thus the coupling characteristic is not completely flat but is undulating.

For this reason, in the directional coupler disclosed in Patent Document 2, when the frequency band that is used is relatively narrow, a good coupling characteristic is exhibited. However, when the frequency band that is used is wide, there is an issue of an increase in the amplitude of an undulation, causing an error to occur in a coupling signal output from a coupling terminal.

Thus, the present disclosure provides a directional coupler in which a coupling characteristic is flat.

To solve the above-described existing issue, a non-reciprocal circuit device according to an embodiment of the present disclosure includes an input terminal, an output terminal, a coupling terminal, a termination terminal, a ground terminal, a main line connected between the input terminal and the output terminal, and a sub line connected between the coupling terminal and the termination terminal. The main line and the sub line are electromagnetically coupled to each other. The sub line includes at least a first sub line and at least a second sub line that are connected to each other. A phase conversion unit is connected between the first sub line and the second sub line. Between a point between the coupling terminal and the termination terminal, and the ground terminal, a resonant circuit is connected in which an inductor, a capacitor, and a resistor are connected in series. Incidentally, in the resonant circuit, as the order in which the inductor, the capacitor, and the resistor are connected, any order can be selected.

Since, in the directional coupler according to the present disclosure, the resonant circuit is provided in which the inductor, the capacitor, and the resistor are connected in series, the coupling characteristic is flat.

DETAILED DESCRIPTION

Embodiments for implementing the present disclosure will be described below with reference to the drawings.

The embodiments for implementing the present disclosure are exemplified by the following embodiments, and the present disclosure is not limited to details of the embodiments. Furthermore, the present disclosure can be implemented by a combination of details described in different embodiments, and details implemented in this case are also included in the present disclosure. Furthermore, the drawings aid in understanding the description, and, in some cases, figures are schematically drawn. In some cases, a dimensional ratio of a drawn component or between drawn components does not coincide with a dimensional ratio of that or between those described in the description. Furthermore, in some cases, in a drawing, for example, a component described in the description is omitted, or components described in the description are drawn with the number of the components being reduced.

First Embodiment

Figure 1:
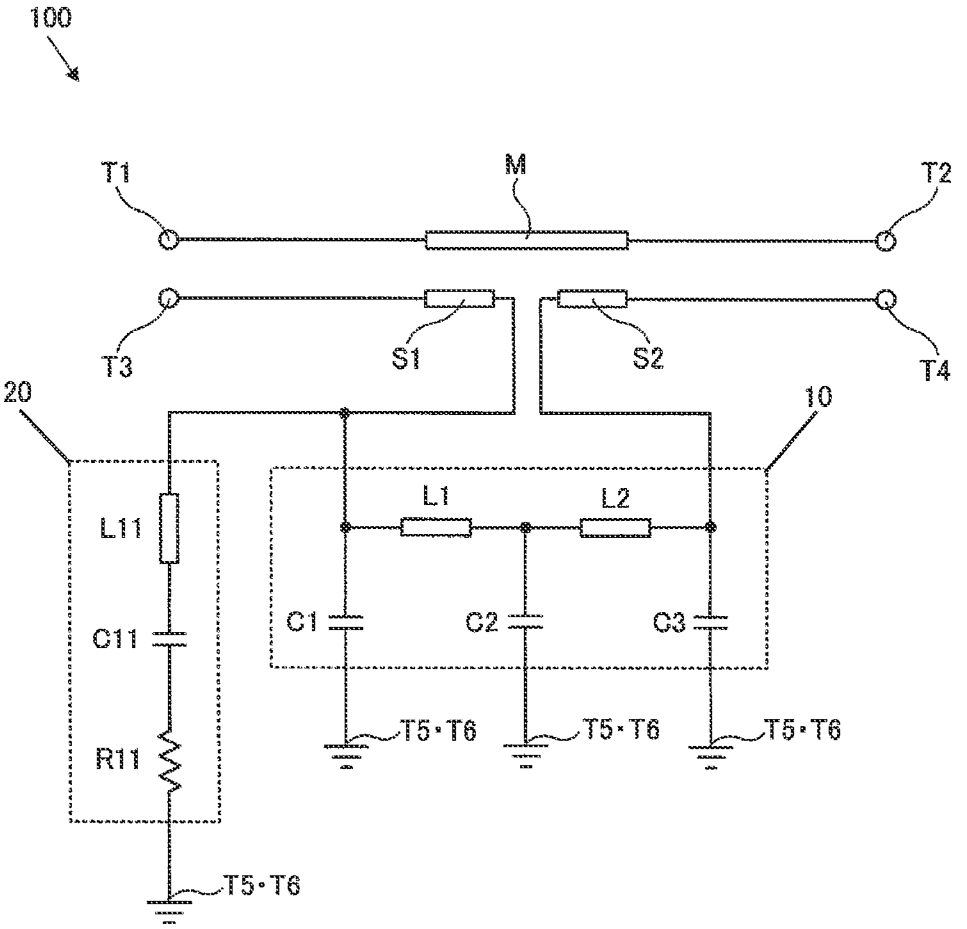
FIG. 1 is an equivalent circuit diagram of a directional coupler according to a first embodiment of the present disclosure.
Figure 2:
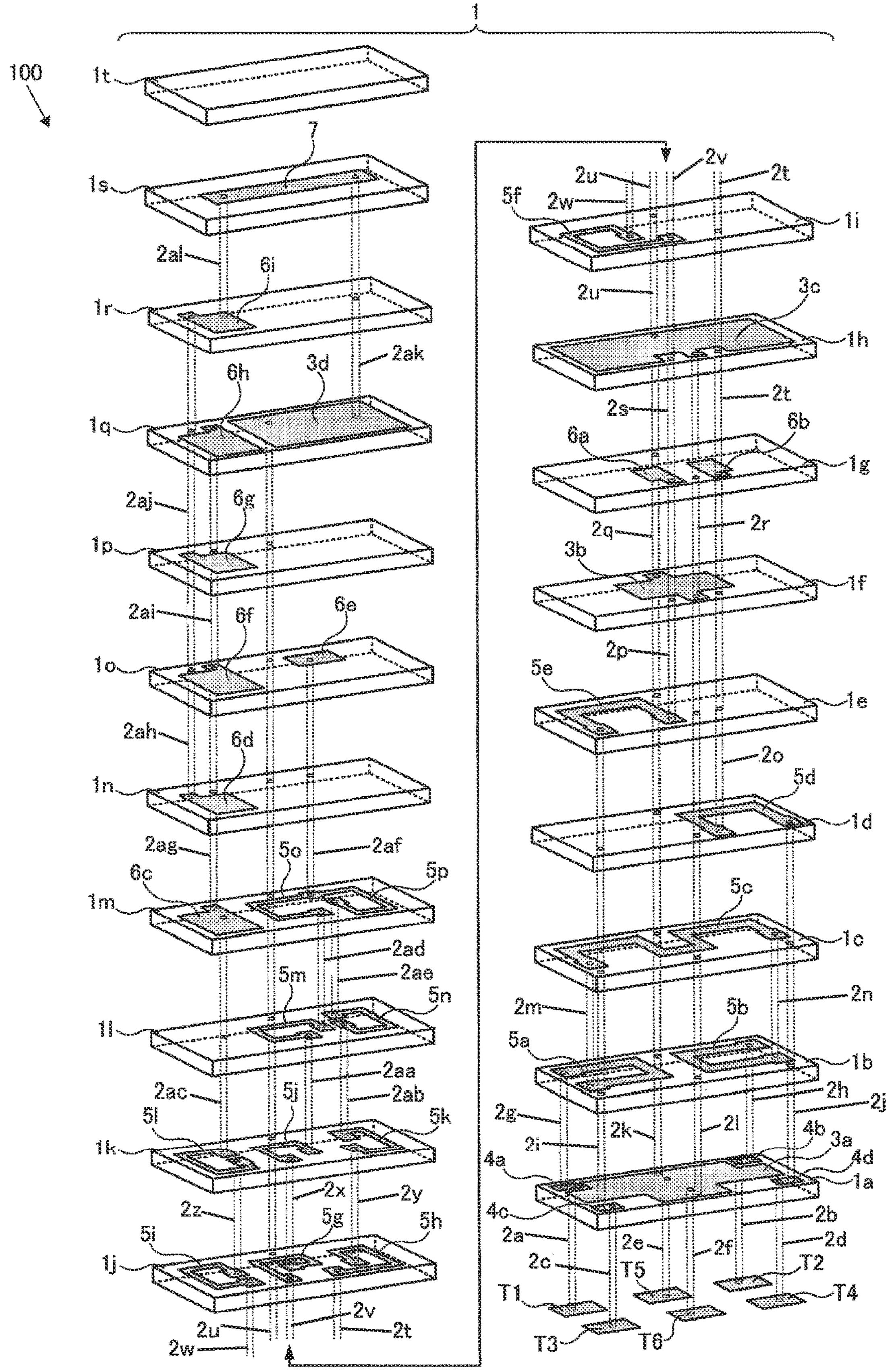
FIG. 2 is an exploded perspective view of the directional coupler according to the first embodiment of the present disclosure.
Figure 3:
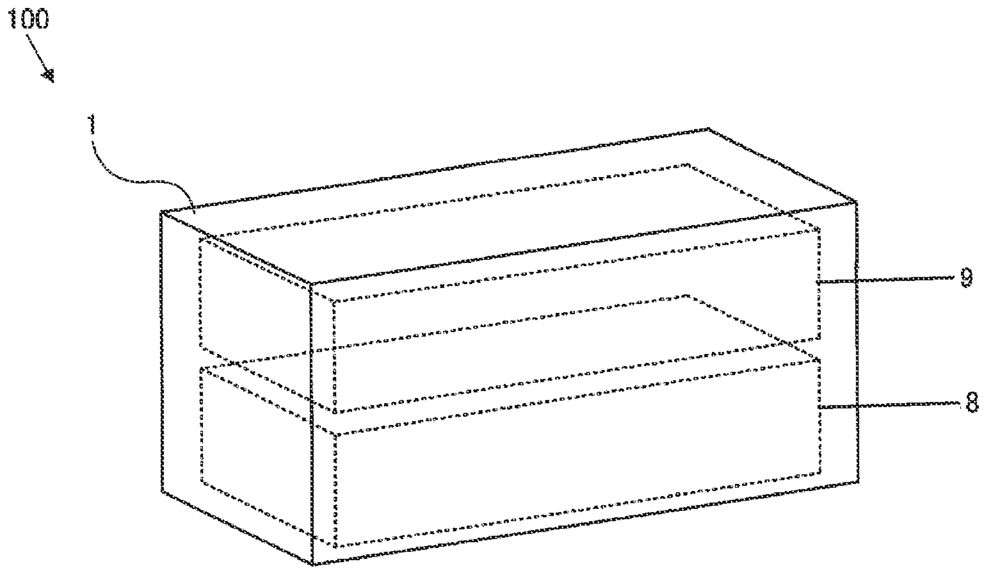
FIG. 3 illustrates the directional coupler according to the first embodiment of the present disclosure.

FIGS. 1 to 3 illustrate a directional coupler 100 according to a first embodiment of the present disclosure. However, FIG. 1 is an equivalent circuit diagram of the directional coupler 100. FIG. 2 is an exploded perspective view of the directional coupler 100. FIG. 3 illustrates the directional coupler 100.

As illustrated in FIG. 1, the directional coupler 100 includes an input terminal T1, an output terminal T2, a coupling terminal T3, a termination terminal T4, and ground terminals T5 and T6.

A main line M is connected between the input terminal T1 and the output terminal T2.

A first sub line S1, a low pass filter 10, which is a phase conversion unit, and a second sub line S2 are connected in this order between the coupling terminal T3 and the termination terminal T4.

In the directional coupler 100, when a signal is input to the input terminal T1, the main line M is electromagnetically coupled to the first sub line S1 and the second sub line S2.

The low pass filter 10 is an LC-based π-type filter. Specifically, in the low pass filter 10, an inductor L1 and an inductor L2 are connected in this order between the first sub line S1 and the second sub line S2. A capacitor C1 is connected between a connection point between the first sub line S1 and the inductor L1, and the ground terminals T5 and T6. A capacitor C2 is connected between a connection point between the inductor L1 and the inductor L2, and the ground terminals T5 and T6. A capacitor C3 is connected between a connection point between the inductor L2 and the second sub line S2, and the ground terminals T5 and T6.

In the directional coupler 100, a resonant circuit 20 is connected between the connection point between the first sub line S1 and the inductor L1, and the ground terminals T5 and T6. The resonant circuit 20 is a resonant circuit in which an inductor L11, a capacitor C11, and a resistor R11 are connected in series. Incidentally, in the resonant circuit 20, the order in which the inductor L11, the capacitor C11, and the resistor R11 are connected is any order. This order is not limited to the order illustrated in FIG. 1 and can be changed to any order.

Incidentally, the resistor R11 of the resonant circuit 20 is connected to moderate attenuation of a signal passing through the sub lines due to series resonance.

In this embodiment, as illustrated in FIG. 2, the directional coupler 100 is formed as a multilayer body 1 including insulator layers 1*a* to 1*t* that are laminated. The multilayer body 1 has a rectangular parallelepiped shape.

As a material of the insulator layers 1*a* to 1*t* constituting the multilayer body 1, ceramic is used. Each of the insulator layers 1*a* to 1*t* is a dielectric layer with a dielectric constant. However, the material of the insulator layers 1*a* to 1*t* (multilayer body 1) is any material, and, for example, a resin may be used in place of ceramic.

On a bottom surface of the insulator layer 1*a* (multilayer body 1), the input terminal T1, the output terminal T2, the coupling terminal T3, the termination terminal T4, and the ground terminals T5 and T6 are provided. The input terminal T1, the output terminal T2, the coupling terminal T3, the termination terminal T4, and the ground terminals T5 and T6 are made of metal containing, as a main component, for example, Ag, Cu, or an alloy of Ag and Cu. On their surfaces, one plated layer or a plurality of plated layers containing, as a main component, for example, Ni, Sn, or Au can be provided.

Via electrodes 2*a* to 2*f* are provided so as to extend between upper and lower main faces of the insulator layer 1*a*.

A ground electrode 3*a*, and relay electrodes 4*a* to 4*d* are provided on the upper main face of the insulator layer 1*a*.

Via electrodes 2*g* to 2*l* are provided so as to extend between upper and lower main faces of the insulator layer 1*b*.

Line electrodes 5*a* and 5*b* are provided on the upper main face of the insulator layer 1*b*.

The above-described via electrodes 2*i* to 2*l*, and via electrodes 2*m* and 2*n* are provided so as to extend between upper and lower main faces of the insulator layer 1*c*.

A line electrode 5*c* is provided on the upper main face of the insulator layer 1*c*.

The above-described via electrodes 2*i* to 2*l* are provided so as to extend between upper and lower main faces of the insulator layer 1*d*.

A line electrode 5*d* is provided on the upper main face of the insulator layer 1*d*.

The above-described via electrodes 2*i*, 2*k*, and 2*l*, and a via electrode 2*o* are provided so as to extend between upper and lower main faces of the insulator layer 1*e*.

A line electrode 5*e* is provided on the upper main face of the insulator layer 1*e*.

The above-described via electrode 2*k*, 21, and 2*o*, and a via electrode 2*p* are provided so as to extend between upper and lower main faces of the insulator layer 1*f*.

A ground electrode 3*b* is provided on the upper main face of the insulator layer 1*f*.

The above-described via electrodes 2*o* and 2*p*, and via electrodes 2*q* and 2*r* are provided so as to extend between upper and lower main faces of the insulator layer 1*g*.

Capacitor electrodes 6*a* and 6*b* are provided on the upper main face of the insulator layer 1*g*.

The above-described via electrodes 2*q* and 2*r*, and via electrodes 2*s* and 2*t* are provided so as to extend between upper and lower main faces of the insulator layer 1*h*.

A ground electrode 3*c* is provided on the upper main face of the insulator layer 1*h*.

The above-described via electrodes 2*s* and 2*t*, and a via electrode 2*u* are provided so as to extend between upper and lower main faces of the insulator layer 1*i*.

A line electrode 5*f* is provided on the upper main face of the insulator layer 1*i*.

The above-described via electrodes 2*t* and 2*u*, and via electrodes 2*v* and 2*w* are provided so as to extend between upper and lower main faces of the insulator layer 1*j*.

Line electrodes 5*g* to 5*i* are provided on the upper main face of the insulator layer 1*j*.

The above-described via electrode 2*u*, and via electrodes 2*x* to 2*z* are provided so as to extend between upper and lower main faces of the insulator layer 1*k*.

Line electrodes 5*j* to 5*l* are provided on the upper main face of the insulator layer 1*k*.

The above-described via electrode 2*u*, and via electrodes 2*aa* to 2*ac* are provided so as to extend between upper and lower main faces of the insulator layer 1*l*.

Line electrodes 5*m* and 5*n* are provided on the upper main face of the insulator layer 1*l*.

The above-described via electrodes 2*u* and 2*ac*, and via electrodes 2*ad* and 2*ae* are provided so as to extend between upper and lower main faces of the insulator layer 1*m*.

Line electrodes 5*o* and 5*p*, and a capacitor electrode 6*c* are provided on the upper main face of the insulator layer 1*m*.

The above-described via electrode 2*u*, and via electrodes 2*af* and 2*ag* are provided so as to extend between upper and lower main faces of the insulator layer 1*n*.

A capacitor electrode 6*d* is provided on the upper main face of the insulator layer 1*n*.

The above-described via electrodes 2*u*, 2*af*, and 2*ag*, and a via electrode 2*ah* are provided so as to extend between upper and lower main faces of the insulator layer 1*o*.

Capacitor electrodes 6*e* and 6*f* are provided on the upper main face of the insulator layer 1*o*.

The above-described via electrodes 2*u* and 2*ah*, and a via electrode 2*ai* are provided so as to extend between upper and lower main faces of the insulator layer 1*p*.

A capacitor electrode 6*g* is provided on the upper main face of the insulator layer 1*p*.

The above-described via electrode 2*u* and 2*ai*, and a via electrode 2*aj* are provided so as to extend between upper and lower main faces of the insulator layer 1*q*.

A ground electrode 3*d* and a capacitor electrode 6*h* are provided on the upper main face of the insulator layer 1*q*.

The above-described via electrode 2*aj* and a via electrode 2*ak* are provided so as to extend between upper and lower main faces of the insulator layer 1*r*.

A capacitor electrode 6*i* is provided on the upper main face of the insulator layer 1*r*.

The above-described via electrode 2*ak* and a via electrode 2*al* are provided so as to extend between upper and lower main faces of the insulator layer 1*s*.

A resistor 7 is provided on the upper main face of the insulator layer 1*s*.

The insulator layer 1*t* is a protective layer.

As a material of the via electrodes 2*a* to 2*al*, the ground electrodes 3*a* to 3*d*, the relay electrodes 4*a* to 4*d*, the line electrodes 5*a* to 5*p*, and the capacitor electrodes 6*a* to 6*i*, metal containing, as a main component, for example, Ag, Cu, or an alloy of Ag and Cu can be used. Furthermore, as a material of the resistor 7, a resistance element made of non-precious metal, such as a nickel-chromium alloy or ruthenium oxide, can be used.

Next, connection relationships among the input terminal T1, the output terminal T2, the coupling terminal T3, the termination terminal T4, the via electrodes 2*a* to 2*al*, the ground electrodes 3*a* to 3*d*, the relay electrodes 4*a* to 4*d*, the line electrodes 5*a* to 5*p*, the capacitor electrodes 6*a* to 6*i*, and the resistor 7 will be described.

The input terminal T1 and the relay electrode 4*a* are connected by the via electrode 2*a*. The output terminal T2 and the relay electrode 4*b* are connected by the via electrode 2*b*. The coupling terminal T3 and the relay electrode 4*c* are connected by the via electrode 2*c*. The termination terminal T4 and the relay electrode 4*d* are connected by the via electrode 2*d*. The ground terminal T5 and the ground electrode 3*a* are connected by the via electrode 2*e*. The ground terminal T6 and the ground electrode 3*a* are connected by the via electrode 2*f*.

The relay electrode 4*a* and one end of the line electrode 5*a* are connected by the via electrode 2*g*. The relay electrode 4*b* and one end of the line electrode 5*b* are connected by the via electrode 2*h*. The relay electrode 4*c* and one end of the line electrode 5*e* are connected by the via electrode 2*i*. The relay electrode 4*d* and one end of the line electrode 5*d* are connected by the via electrode 2*j*. The ground electrode 3*a* and the ground electrode 3*b* are connected by the via electrodes 2*k* and 2*l*.

The other end of the line electrode 5*a* and one end of the line electrode 5*c* are connected by the via electrode 2*m*. The other end of the line electrode 5*b* and the other end of the line electrode 5*c* are connected by the via electrode 2*n*.

The other end of the line electrode 5*d* and the capacitor electrode 6*b* are connected by the via electrode 2*o*.

The other end of the line electrode 5*e* and the capacitor electrode 6*a* are connected by the via electrode 2*p*.

The ground electrode 3*b* and the ground electrode 3*c* are connected by the via electrodes 2*q* and 2*r*.

The capacitor electrode 6*a* and one end of the line electrode 5*f* are connected by the via electrode 2*s*.

The capacitor electrode 6*b* and one end of the line electrode 5*h* are connected by the via electrode 2*t*.

The ground electrode 3*c* and the ground electrode 3*d* are connected by the via electrode 2*u*.

The one end of the line electrode 5*f* and one end of the line electrode 5*g* are connected by the via electrode 2*v*.

The other end of the line electrode 5*f* and one end of the line electrode 5*i* are connected by the via electrode 2*w*.

The other end of the line electrode 5*g* and one end of the line electrode 5*j* are connected by the via electrode 2*x*.

The other end of the line electrode 5*h* and one end of the line electrode 5*k* are connected by the via electrode 2*y*.

The other end of the line electrode 5*i* and one end of the line electrode 5*l* are connected by the via electrode 2*z*.

The other end of the line electrode 5*j* and one end of the line electrode 5*m* are connected by the via electrode 2*aa*.

The other end of the line electrode 5*k* and one end of the line electrode 5*n* are connected by the via electrode 2*ab*.

The other end of the line electrode 5*l* and the capacitor electrode 6*c* are connected by the via electrode 2*ac*.

The other end of the line electrode 5*m* and one end of the line electrode 5*o* are connected by the via electrode 2*ad*.

The other end of the line electrode 5*n* and one end of the line electrode 5*p* are connected by the via electrode 2*ae*.

The other end of the line electrode 5*o* and the other end of the line electrode 5*p* are connected to each other. A connection point between the line electrode 5*o* and the line electrode 5*p*, and the capacitor electrode 6*e* are connected by the via electrode 2*af*.

The capacitor electrode 6*c* and the capacitor electrode 6*f* are connected by the via electrode 2*ag*.

The capacitor electrode 6*d* and the capacitor electrode 6*g* are connected by the via electrode 2*ah*.

The capacitor electrode 6*f* and the capacitor electrode 6*h* are connected by the via electrode 2*ai*.

The capacitor electrode 6*g* and the capacitor electrode 6*i* are connected by the via electrode 2*aj*.

The ground electrode 3*d* and one end of the resistor 7 are connected by the via electrode 2*ak*.

The capacitor electrode 6*i* and the other end of the resistor 7 are connected by the via electrode 2*al*.

Next, relationships between the equivalent circuit of the directional coupler 100 illustrated in FIG. 1, and the above-described input terminal T1, output terminal T2, coupling terminal T3, termination terminal T4, via electrodes 2*a* to 2*al*, ground electrodes 3*a* to 3*d*, relay electrodes 4*a* to 4*d*, line electrodes 5*a* to 5*p*, capacitor electrodes 6*a* to 6*i*, and resistor 7 will be described.

The main line M is formed by a conductive path starting from the input terminal T1, passing through the via electrode 2*a*, the relay electrode 4*a*, the via electrode 2*g*, the line electrode 5*a*, the via electrode 2*m*, the line electrode 5*c*, the via electrode 2*n*, the line electrode 5*b*, the via electrode 2*h*, the relay electrode 4*b*, and the via electrode 2*b*, and ending at the output terminal T2.

The first sub line S1 is formed by a conductive path starting from the coupling terminal T3, passing through the via electrode 2*c*, the relay electrode 4*c*, the via electrode 2*i*, and the line electrode 5*e*, and ending at the other end of the line electrode 5*e*.

The second sub line S2 is formed by a conductive path starting from the other end of the line electrode 5*d*, passing through the line electrode 5*d*, the via electrode 2*j*, the relay electrode 4*d*, and the via electrode 2*d*, and ending at the termination terminal T4.

The inductor L1 of the low pass filter 10 is formed by a conductive path starting from the other end of the line electrode 5*e*, passing through the via electrode 2*p*, 2*s*, and 2*v*, the line electrode 5*g*, the via electrode 2*x*, the line electrode 5*j*, the via electrode 2*aa*, the line electrode 5*m*, the via electrode 2*ad*, and the line electrode 5*o*, and ending at the connection point between the line electrode 5*o* and the line electrode 5*p*.

The inductor L2 of the low pass filter 10 is formed by a conductive path starting from the connection point between the line electrode 5*o* and the line electrode 5*p*, passing through the line electrode 5*p*, the via electrode 2*ae*, the line electrode 5*n*, the via electrode 2*ab*, the line electrode 5*k*, the via electrode 2*y*, the line electrode 5*h*, and the via electrodes 2*t* and 2*o*, and ending at the other end of the line electrode 5*d*.

The capacitor C1 of the low pass filter 10 is formed by capacitances between the capacitor electrode 6*a*, and the ground electrodes 3*b* and 3*c*.

The capacitor C2 of the low pass filter 10 is formed by a capacitance between the capacitor electrode 6*e* and the ground electrode 3*d*.

The capacitor C3 of the low pass filter 10 is formed by capacitances between the capacitor electrode 6*b*, and the ground electrodes 3*b* and 3*c*.

The inductor L11 of the resonant circuit 20 is formed by a conductive path starting from the one end of the line electrode 5*f*, passing through the line electrode 5*f*, the via electrode 2*w*, the line electrode 5*i*, the via electrode 2*z*, the line electrode 5*l*, and the via electrode 2*ac*, and ending at the capacitor electrode 6*c*.

The capacitor C11 of the resonant circuit 20 is formed by capacitances between the capacitor electrodes 6*c*, 6*f*, and 6*h*, and the capacitor electrodes 6*d*, 6*g*, and 6*i*.

The resistor R11 of the resonant circuit 20 is formed by the resistor 7.

The directional coupler 100 with the above structure can be manufactured by a typical manufacturing method for manufacturing a directional coupler including a multilayer body including insulator layers that are laminated.

As illustrated in FIG. 3, in the directional coupler 100, a coupler section including the main line M and a plurality of sub lines (first sub line S1, second sub line S2) is disposed in a lower portion 8 of the multilayer body 1, and the phase conversion unit (low pass filter 10) and the resonant circuit 20 are disposed in an upper portion 9 of the multilayer body 1. For the directional coupler 100, when such a disposition structure is employed, electronic components are efficiently disposed within the multilayer body 1.

Furthermore, in the directional coupler 100, the ground electrode 3*c* is provided in an interlayer space of the multilayer body 1, which is a space between the lower portion 8 and the upper portion 9. Hence, in the directional coupler 100, interference between the coupler section, and the phase conversion unit (low pass filter 10) and the resonant circuit 20 is suppressed by the ground electrode 3*c*.

Figure 4A:
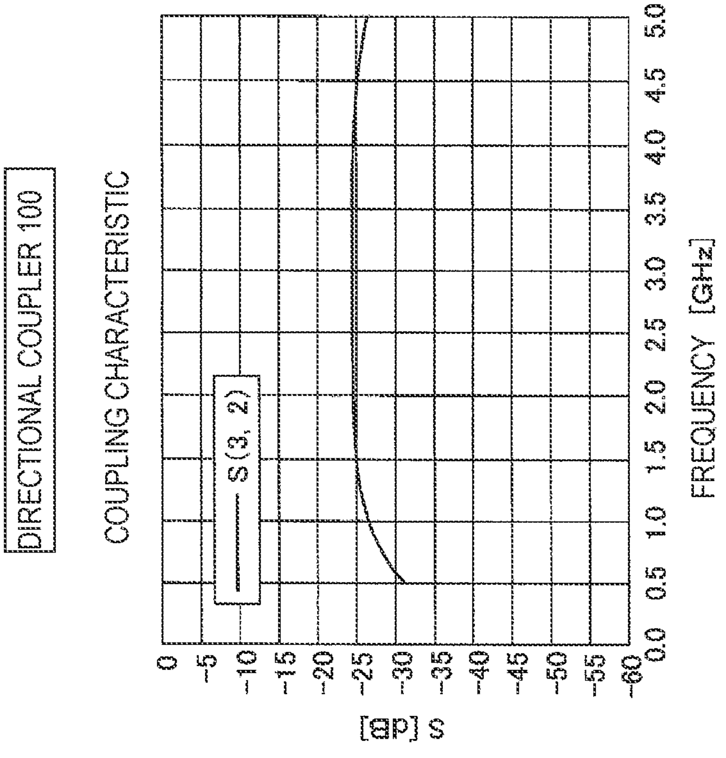
FIGS. 4A and 4B include graphs illustrating a coupling characteristic of the directional coupler according to the first embodiment of the present disclosure and that of a comparative example.
Figure 4B:
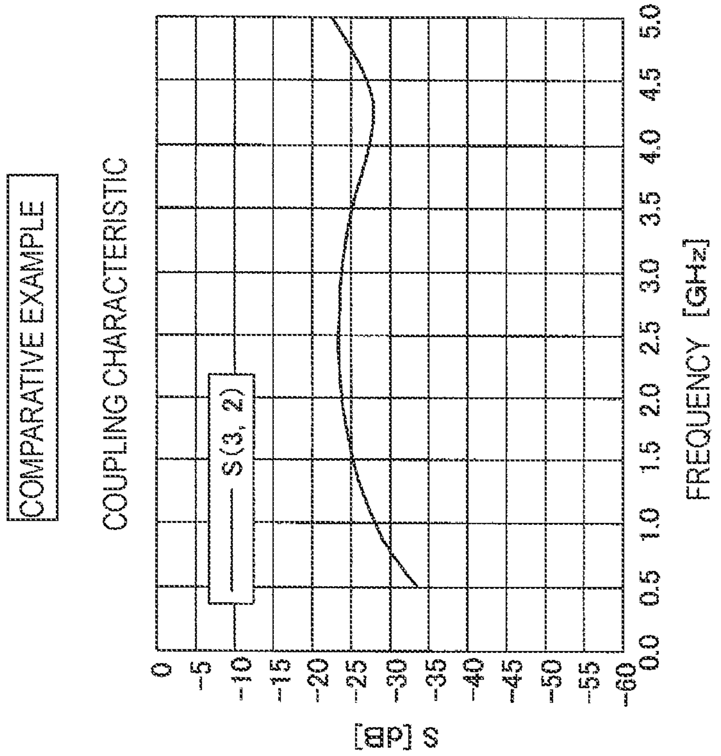

FIG. 4A illustrates a coupling characteristic of S(3, 2) of the directional coupler 100. Furthermore, for comparison purposes, FIG. 4B illustrates a coupling characteristic of S(3, 2) of a comparative example in which the resonant circuit 20 is removed from the directional coupler 100.

Figure 5A:
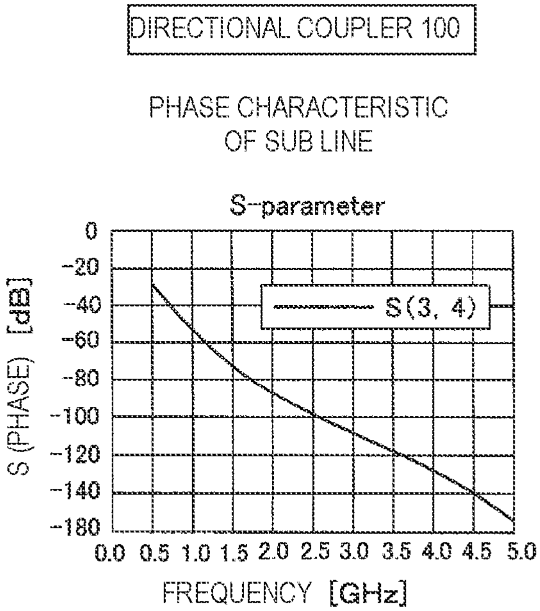
FIG. 5A includes a graph illustrating a phase characteristic of a sub line of the directional coupler according to the first embodiment of the present disclosure, and FIG. 5C includes a graph illustrating a bandpass characteristic of a sub line of the directional coupler according to the first embodiment of the present disclosure.

Furthermore, FIG. 5A illustrates a phase characteristic of S(3, 4) of the directional coupler 100. For comparison purposes, FIG. 5B illustrates a phase characteristic of S(3, 4) of the comparative example in which the resonant circuit 20 is removed from the directional coupler 100.

Figure 5B:
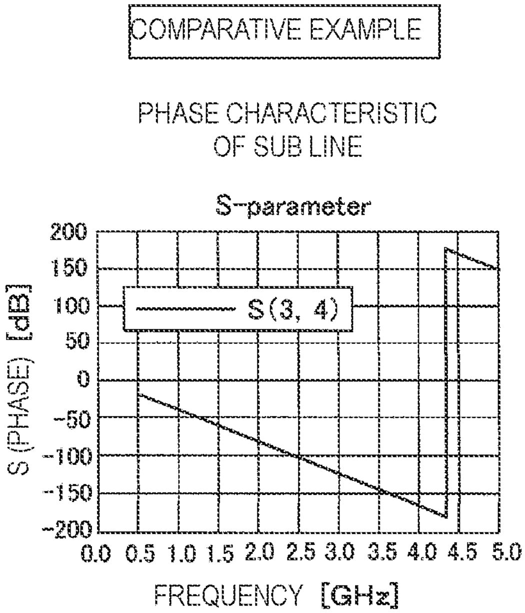
FIG. 5B includes a graph illustrating a phase characteristic of a subline of the comparative example, and FIG. 5D includes a graph illustrating a bandpass characteristic of a sub line of the comparative example.
Figure 5C:
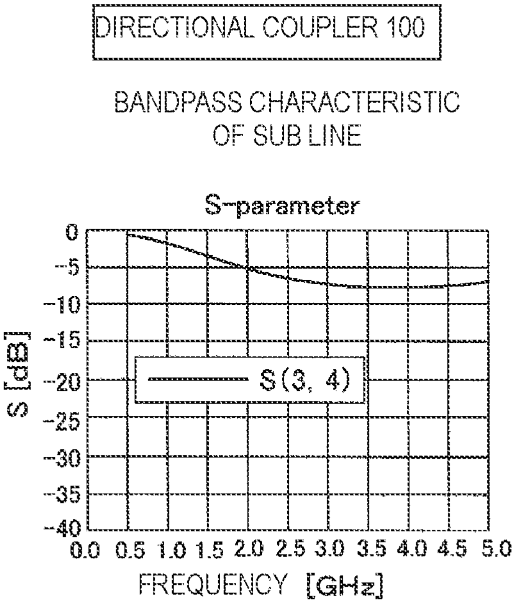

Furthermore, FIG. 5C illustrates a bandpass characteristic of S(3, 4) of the directional coupler 100. For comparison purposes, FIG. 5D illustrates a bandpass characteristic of S(3, 4) of the comparative example in which the resonant circuit 20 is removed from the directional coupler 100.

Incidentally, these characteristics are measured assuming that the output terminal T2 is a first terminal, the input terminal T1 is a second terminal, the coupling terminal T3 is a third terminal, and the termination terminal T4 is a fourth terminal.

As seen from FIG. 5B, in the comparative example, the phase changes linearly and reaches a peak of 180 degrees at about 4.3 GHz to return back. Thus, in the comparative example, when a frequency band that is used in the directional coupler is wide, it is difficult to achieve a flat coupling characteristic. On the other hand, as seen from FIG. 5A, in the directional coupler 100, the phase does not return back even at 5.0 GHz.

Figure 5D:
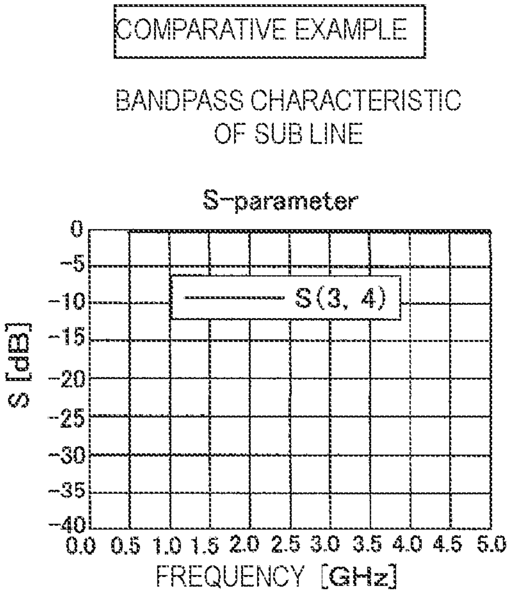

Furthermore, as seen from FIG. 5D, in the comparative example, the bandpass characteristic of S(3, 4) is flat. As seen from FIG. 5C, however, the bandpass characteristic of S(3, 4) of the directional coupler 100 is curved. This is because it is conceivable that, in the directional coupler 100, an attenuation characteristic due to series resonance of the resonant circuit 20 is added to a frequency characteristic of the low pass filter 10, which is the phase conversion unit.

As a result, as illustrated in FIGS. 4(A) and 4(B), the coupling characteristic of the directional coupler 100 is flatter than the coupling characteristic of the comparative example. In the directional coupler 100, the attenuation characteristic due to series resonance of the resonant circuit 20 is added to the frequency characteristic of the low pass filter 10, which is the phase conversion unit, and thus the coupling characteristic is flatter.

As described above, it has been ascertained that, in the directional coupler 100, the provision of the resonant circuit 20 makes the coupling characteristic even flatter.

Second Embodiment

Figure 6:
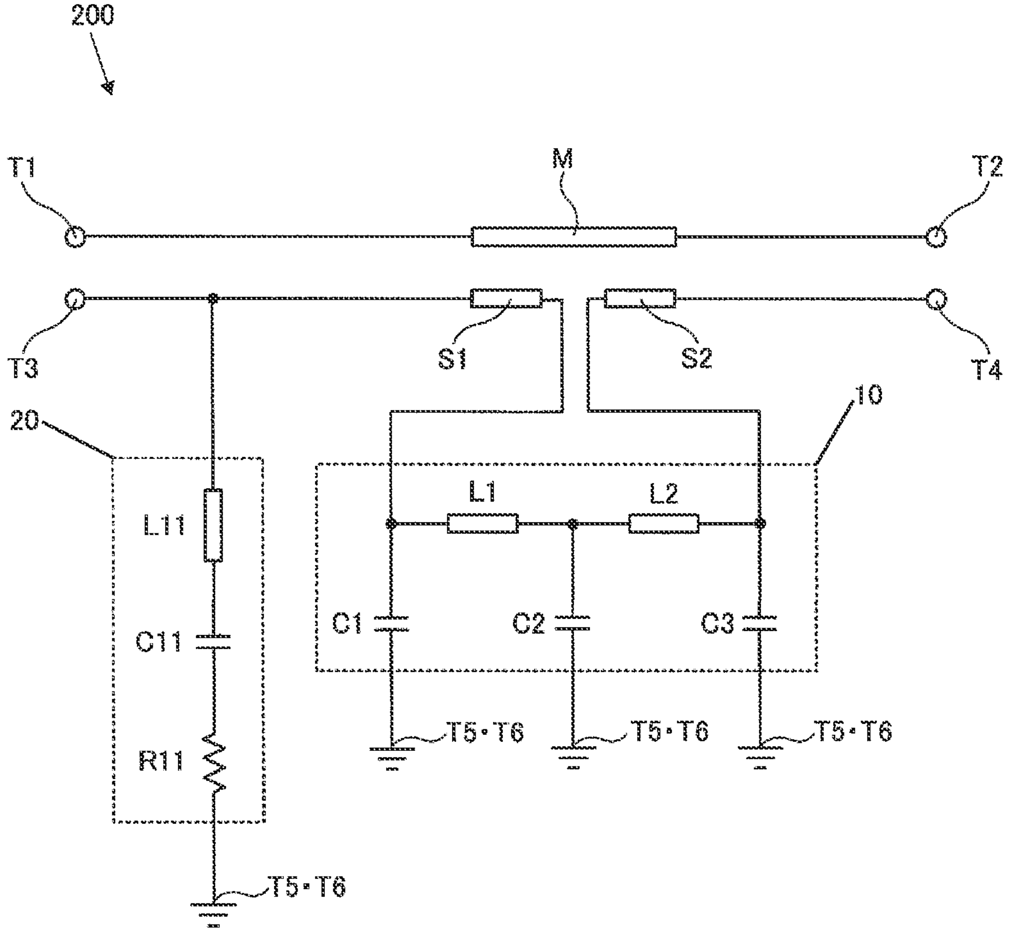
FIG. 6 is an equivalent circuit diagram of a directional coupler according to a second embodiment of the present disclosure.

FIG. 6 illustrates a directional coupler 200 according to a second embodiment of the present disclosure. However, FIG. 6 is an equivalent circuit diagram of the directional coupler 200.

The directional coupler 200 according to the second embodiment differs from the directional coupler 100 according to the first embodiment in a partial configuration. Specifically, in the directional coupler 100, the resonant circuit 20 is connected between a connection point between the first sub line S1 and the phase conversion unit (low pass filter 10), and the ground terminals T5 and T6. In the directional coupler 200, the resonant circuit 20 is connected between a connection point between the coupling terminal T3 and the first sub line S1, and the ground terminals T5 and T6. Except for the above, the configuration of the directional coupler 200 is the same as that of the directional coupler 100.

In the directional coupler 200 as well, the provision of the resonant circuit 20 makes the coupling characteristic even flatter.

Third Embodiment

Figure 7:
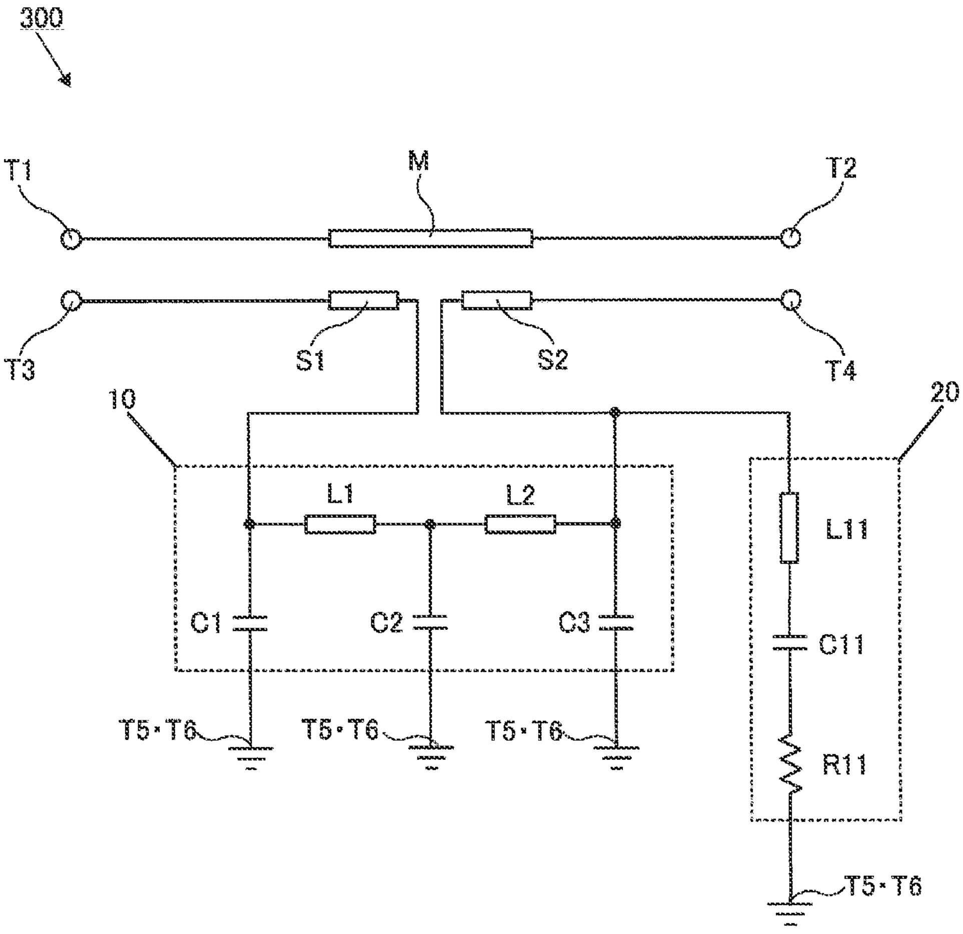
FIG. 7 is an equivalent circuit diagram of a directional coupler according to a third embodiment of the present disclosure.

FIG. 7 illustrates a directional coupler 300 according to a third embodiment of the present disclosure. However, FIG. 7 is an equivalent circuit diagram of the directional coupler 300.

The directional coupler 300 according to the third embodiment differs from the directional coupler 100 according to the first embodiment in a partial configuration. Specifically, in the directional coupler 100, the resonant circuit 20 is connected between the connection point between the first sub line S1 and the phase conversion unit (low pass filter 10), and the ground terminals T5 and T6. In the directional coupler 300, the resonant circuit 20 is connected between a connection point between the phase conversion unit (low pass filter 10) and the second sub line S2, and the ground terminals T5 and T6. Except for the above, the configuration of the directional coupler 300 is the same as that of the directional coupler 100.

In the directional coupler 300 as well, the provision of the resonant circuit 20 makes the coupling characteristic even flatter.

Fourth Embodiment

Figure 8:
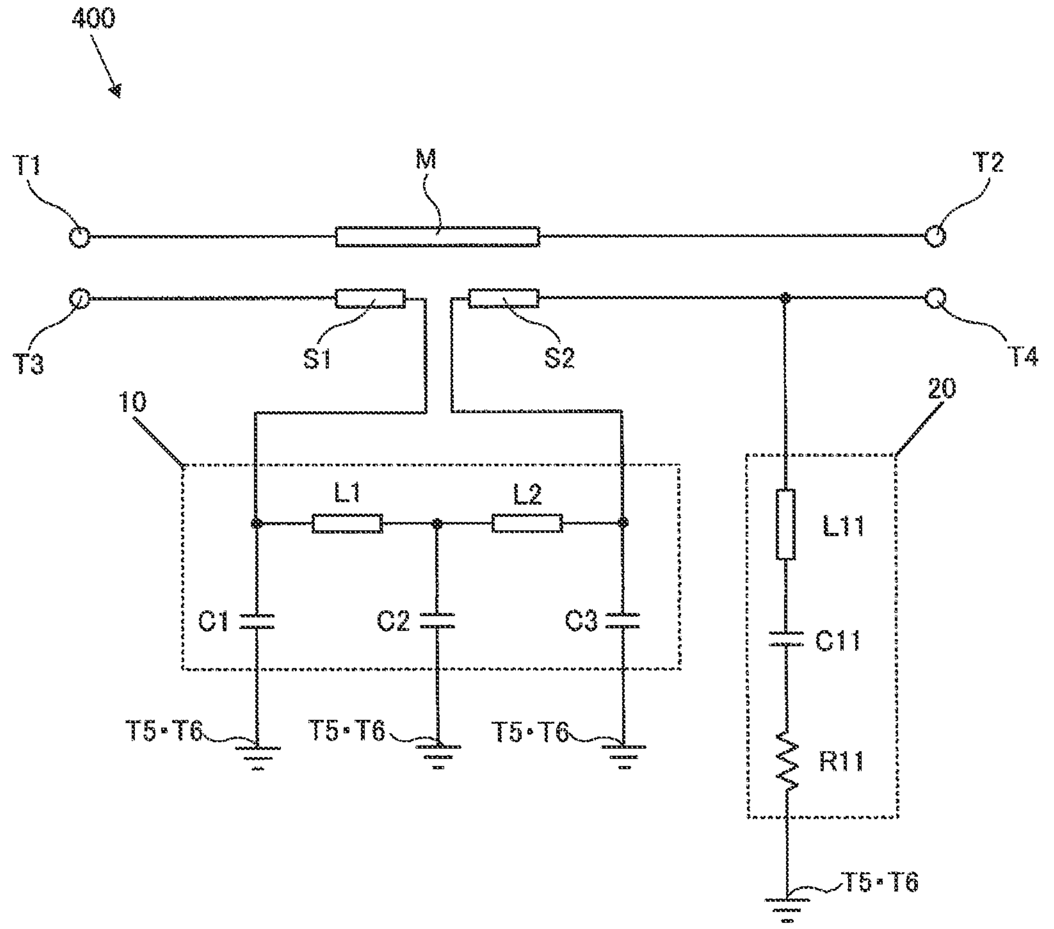
FIG. 8 is an equivalent circuit diagram of a directional coupler according to a fourth embodiment of the present disclosure.

FIG. 8 illustrates a directional coupler 400 according to a fourth embodiment of the present disclosure. However, FIG. 8 is an equivalent circuit diagram of the directional coupler 400.

The directional coupler 400 according to the fourth embodiment differs from the directional coupler 100 according to the first embodiment in a partial configuration. Specifically, in the directional coupler 100, the resonant circuit 20 is connected between the connection point between the first sub line S1 and the phase conversion unit (low pass filter 10), and the ground terminals T5 and T6. In the directional coupler 400, the resonant circuit 20 is connected between a connection point between the second sub line S2 and the termination terminal T4, and the ground terminals T5 and T6. Except for the above, the configuration of the directional coupler 400 is the same as that of the directional coupler 100.

In the directional coupler 400 as well, the provision of the resonant circuit 20 makes the coupling characteristic even flatter.

Fifth Embodiment

Figure 9:
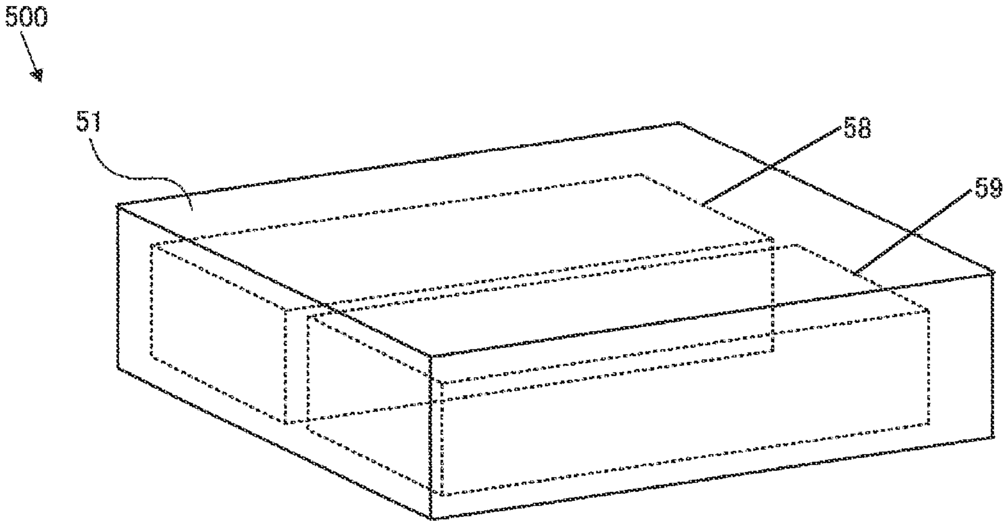
FIG. 9 illustrates a directional coupler according to a fifth embodiment of the present disclosure.

FIG. 9 illustrates a directional coupler 500 according to a fifth embodiment of the present disclosure. However, FIG. 9 illustrates the directional coupler 500.

The directional coupler 500 according to the fifth embodiment differs from the directional coupler 100 according to the first embodiment in a partial configuration. Specifically, as illustrated in FIG. 3, in the directional coupler 100, the coupler section including the main line M and the plurality of sub lines (first sub line S1, second sub line S2) is disposed in the lower portion 8 of the multilayer body 1, and the phase conversion unit (low pass filter 10) and the resonant circuit 20 are disposed in the upper portion 9 of the multilayer body 1. In the directional coupler 500, a first portion 58, which is the coupler section including the main line M and the plurality of sub lines (first sub line S1, second sub line S2), is disposed laterally next to a second portion 59, which includes the phase conversion unit (low pass filter 10) and the resonant circuit 20, in a multilayer body 51.

The directional coupler 500 is lower in profile than the directional coupler 100.

The directional couplers 100, 200, 300, 400, and 500 according to the first to fifth embodiments have been described above. However, the present disclosure is not limited to these descriptions, and various modifications can be made in accordance with the gist of the disclosure.

For example, although, in the directional couplers 100, 200, 300, 400, and 500, the low pass filter 10 is included as a phase conversion unit, the phase conversion unit is not limited to a low pass filter. For example, in place of the low pass filter, an open stub provided between a sub line and a ground may serve as a phase conversion unit.

A directional coupler according to an embodiment of the present disclosure is as described in the "Solution to Problem" section.

In this directional coupler, the phase conversion unit can be a low pass filter. Furthermore, the low pass filter can be a π-type filter. In this case, a good phase shift can be caused to be produced in a signal passing through the sub line.

Furthermore, the resonant circuit can be connected between a connection point between the first sub line and the phase conversion unit, and the ground terminal. Alternatively, the resonant circuit can be connected between a connection point between the coupling terminal and the first sub line, and the ground terminal. Alternatively, the resonant circuit can be connected between a connection point between the phase conversion unit and the second sub line, and the ground terminal. Alternatively, the resonant circuit can be connected between a connection point between the second sub line and the termination terminal, and the ground terminal. In these cases, the coupling characteristic can be made even flatter by the resonant circuit.

Furthermore, there can be included a multilayer body including a plurality of insulator layers that are laminated, a ground electrode provided on an insulator layer, a line electrode provided on an insulator layer, a capacitor electrode provided on an insulator layer, and a resistor provided on an insulator layer. In this case, the directional coupler according to the present disclosure can be readily constructed.

Furthermore, the input terminal, the output terminal, the coupling terminal, the termination terminal, and the ground terminal can be provided on one surface of the multilayer body, a coupler section including the main line and the sub line can be mostly disposed in a one-side portion in a lamination direction of the multilayer body, and the phase conversion unit and the resonant circuit can be mostly disposed in an other-side portion in the lamination direction of the multilayer body. In this case, electronic components can be efficiently disposed within the multilayer body. Furthermore, in this case, the ground electrode can be provided in an interlayer space of the multilayer body, which is a space between the one-side portion in the lamination direction of the multilayer body and the other-side portion in the lamination direction of the multilayer body. In this case, interference between the coupler section, and the phase conversion unit and the resonant circuit can be suppressed by the ground electrode.

Alternatively, the input terminal, the output terminal, the coupling terminal, the termination terminal, and the ground terminal can be provided on one surface of the multilayer body, and a coupler section including the main line and the sub line can be disposed laterally next to the phase conversion unit and the resonant circuit in the multilayer body. In this case, the directional coupler can be reduced in profile.

REFERENCE SIGNS LIST

1 multilayer body
1a to 1t insulator layer
2a to 2al via electrode
3a to 3d ground electrode
4a to 4d relay electrode
5a to 5p line electrode
6a to 6i capacitor electrode
7 resistor
10 low pass filter (phase conversion unit)
20 resonant circuit
T1 input terminal
T2 output terminal
T3 coupling terminal
T4 termination terminal
T5, T6 ground terminal (ground)
M main line
S1 first sub line
S2 second sub line

The invention claimed is:

1. A directional coupler comprising:
an input terminal;
an output terminal;
a coupling terminal;
a termination terminal;
a ground terminal;
a main line connected between the input terminal and the output terminal; and
a sub line connected between the coupling terminal and the termination terminal,
wherein the main line and the sub line are electromagnetically coupled to each other,
wherein the sub line comprises a first sub line and a second sub line that are connected to each other,
wherein a phase conversion circuit is connected between the first sub line and the second sub line,
wherein a resonant circuit is connected between the ground terminal and a point between the coupling terminal and the termination terminal, and
wherein the resonant circuit comprises an inductor, a capacitor, and a resistor connected in series.

2. The directional coupler according to claim 1, wherein the phase conversion circuit is a low pass filter.

3. The directional coupler according to claim 2, wherein the low pass filter is a π-type filter.

4. The directional coupler according to claim 1, wherein the resonant circuit is connected between the ground terminal and a connection point between the first sub line and the phase conversion circuit.

5. The directional coupler according to claim 1, wherein the resonant circuit is connected between the ground terminal and a connection point between the coupling terminal and the first sub line.

6. The directional coupler according to claim 1, wherein the resonant circuit is connected between the ground terminal and a connection point between the phase conversion circuit and the second sub line.

7. The directional coupler according to claim 2, wherein the resonant circuit is connected between the ground terminal and a connection point between the phase conversion circuit and the second sub line.

8. The directional coupler according to claim 3, wherein the resonant circuit is connected between the ground terminal and a connection point between the phase conversion circuit and the second sub line.

9. The directional coupler according to claim 1, wherein the resonant circuit is connected between the ground terminal and a connection point between the second sub line and the termination terminal.

10. The directional coupler according to claim 1, further comprising:
a multilayer body comprising a plurality of insulator layers that are laminated;
a ground electrode on the laminated insulator layers;
a line electrode on the laminated insulator layers;
a capacitor electrode on the laminated insulator layers; and
a resistor on the laminated insulator layers.

11. The directional coupler according to claim 10,
wherein the input terminal, the output terminal, the coupling terminal, the termination terminal, and the ground terminal are on one surface of the multilayer body,
wherein more than half of a coupler section including the main line and the sub line is disposed in a first half portion of the multilayer body in a lamination direction, and
wherein the phase conversion circuit and the resonant circuit are more than half disposed in a second half portion of the multilayer body in the lamination direction, the first half portion and the second half portion being in different halves of the multilayer body.

12. The directional coupler according to claim 11, wherein the ground electrode is between the first half portion of the multilayer body and the second half portion of the multilayer body.

13. The directional coupler according to claim 10,
wherein the input terminal, the output terminal, the coupling terminal, the termination terminal, and the ground terminal are on one surface of the multilayer body, and
wherein a coupler section comprising the main line and the sub line is laterally next to the phase conversion circuit and the resonant circuit in the multilayer body.

* * * * *